(12) United States Patent
Byun et al.

(10) Patent No.: US 11,966,760 B2
(45) Date of Patent: Apr. 23, 2024

(54) DISPLAY APPARATUS AND CONTROLLING METHOD THEREOF

(71) Applicant: SAMSUNG ELECTRONICS CO., LTD., Suwon-si (KR)

(72) Inventors: Kwangsub Byun, Suwon-si (KR); Seungjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/126,036

(22) Filed: Mar. 24, 2023

(65) Prior Publication Data

US 2023/0229464 A1 Jul. 20, 2023

Related U.S. Application Data

(63) Continuation of application No. PCT/KR2022/021610, filed on Dec. 29, 2022.

(30) Foreign Application Priority Data

Dec. 29, 2021 (KR) .................. 10-2021-0191348
Mar. 17, 2022 (KR) .................. 10-2022-0033605

(51) Int. Cl.
*G06F 3/048* (2013.01)
*G06F 3/14* (2006.01)
*G06F 9/451* (2018.01)

(52) U.S. Cl.
CPC ................ *G06F 9/451* (2018.02); *G06F 3/14* (2013.01)

(58) Field of Classification Search
CPC .................................. G06F 9/451; G06F 3/14
See application file for complete search history.

(56) References Cited

U.S. PATENT DOCUMENTS

| | | | |
|---|---|---|---|
| 8,881,065 B2 | 11/2014 | Nickell et al. | |
| 8,918,662 B2 | 12/2014 | Root et al. | |
| 9,965,015 B2 | 5/2018 | Im et al. | |
| 10,021,437 B1* | 7/2018 | Tatem | H04N 21/436 |
| 10,079,839 B1* | 9/2018 | Bryan | G05B 15/02 |
| 10,083,673 B2 | 9/2018 | Jeon | |
| 10,289,428 B2 | 5/2019 | Im et al. | |
| 10,521,240 B2 | 12/2019 | Lee et al. | |

(Continued)

FOREIGN PATENT DOCUMENTS

| | | |
|---|---|---|
| CN | 111836115 B | 12/2021 |
| JP | 2000-163034 A | 6/2000 |

(Continued)

OTHER PUBLICATIONS

International Search Report (PCT/ISA/210) issued by the International Searching Authority dated Apr. 10, 2023 for International Patent Application No. PCT/KR2022/021610.

(Continued)

*Primary Examiner* — David Phantana-angkool
(74) *Attorney, Agent, or Firm* — Sughrue Mion, PLLC

(57) ABSTRACT

A display apparatus is provided. The display apparatus includes a display and a processor configured to count time for operating a screen saver after a user input is received, and based on the counted time corresponding to a threshold time, control the display to display a screen corresponding to the screen saver by operating the screen saver.

20 Claims, 11 Drawing Sheets

(56) References Cited

U.S. PATENT DOCUMENTS

| | | | |
|---|---|---|---|
| 11,250,774 B2 | 2/2022 | Kang et al. | |
| 11,316,958 B2* | 4/2022 | Decenzo | H04L 67/12 |
| 2007/0277127 A1 | 11/2007 | Carlson et al. | |
| 2010/0157990 A1* | 6/2010 | Krzyzanowski | G01D 11/245 |
| | | | 370/352 |
| 2011/0154270 A1 | 6/2011 | Sonoda et al. | |
| 2012/0173890 A1* | 7/2012 | Root | G06F 1/1632 |
| | | | 713/300 |
| 2014/0139567 A1 | 5/2014 | Jeon | |
| 2015/0194084 A1* | 7/2015 | Lee | G06F 3/14 |
| | | | 345/2.3 |
| 2016/0148042 A1* | 5/2016 | Gonion | G06V 40/164 |
| | | | 715/784 |
| 2016/0173942 A1* | 6/2016 | Ransom | H04N 21/812 |
| | | | 725/34 |
| 2016/0364195 A1 | 12/2016 | Im et al. | |
| 2016/0364246 A1 | 12/2016 | Lee et al. | |
| 2017/0068511 A1* | 3/2017 | Brown | G06F 3/04847 |
| 2017/0358305 A1* | 12/2017 | Kudurshian | G10L 15/22 |
| 2018/0091851 A1* | 3/2018 | Bae | H04N 21/42204 |
| 2018/0176632 A1* | 6/2018 | Yang | H04N 21/4122 |
| 2018/0192107 A1* | 7/2018 | Seo | H04N 21/2665 |
| 2018/0292881 A1* | 10/2018 | Duale | G06F 1/3228 |
| 2019/0158304 A1* | 5/2019 | Sundermeyer | H04L 12/2818 |
| 2020/0042689 A1* | 2/2020 | Civelli | G06F 1/3231 |
| 2022/0187983 A1* | 6/2022 | Singh | G06F 3/011 |
| 2022/0198984 A1* | 6/2022 | Connor | G04G 9/122 |
| 2022/0269831 A1* | 8/2022 | Kapinos | G06F 21/32 |
| 2023/0229464 A1* | 7/2023 | Byun | G06F 9/451 |
| | | | 715/867 |
| 2023/0252779 A1* | 8/2023 | Gonion | G06F 3/005 |
| | | | 382/118 |

FOREIGN PATENT DOCUMENTS

| | | |
|---|---|---|
| JP | 5363489 B2 | 12/2013 |
| KR | 10-2013-0100797 A | 9/2013 |
| KR | 10-2015-0101356 A | 9/2015 |
| KR | 10-2048897 B1 | 11/2019 |
| KR | 10-2238533 B1 | 4/2021 |
| KR | 10-2021-0106067 A | 8/2021 |

OTHER PUBLICATIONS

Written Opinion (PCT/ISA/237) issued by the International Searching Authority dated Apr. 10, 2023 for International Patent Application No. PCT/KR2022/021610.

* cited by examiner

DISPLAY APPARATUS AND CONTROLLING METHOD THEREOF

CROSS-REFERENCE TO RELATED APPLICATION(S)

This application is a bypass continuation of International Application No. PCT/KR2022/021610, filed on Dec. 29, 2022, which is based on and claims priority to Korean Patent Application No. 10-2021-0191348, filed on Dec. 29, 2021, in the Korean Intellectual Property Office and Korean Patent Application No. 10-2022-0033605, filed on Mar. 17, 2022, in the Korean Intellectual Property Office, the disclosures of which are incorporated by reference herein in their entireties.

BACKGROUND

1. Field

This disclosure relates to a display apparatus and a controlling method thereof and more particularly, to a display apparatus that operates and displays a screen saver and a controlling method thereof.

2. Description of Related Art

Recently, various types of display apparatuses have been developed and distributed.

In particular, as display apparatuses get bigger and have higher resolution, the power consumption of the display apparatus proportionally increase.

When a display apparatus does not operate for a certain period of time or a user does not use the display apparatus, the display apparatus may be switched to a standby mode (power saving mode). In such a standby mode, a screen saver may be operated to minimize power consumption of a display panel which is a main power consumption component of the display apparatus.

In addition, a screen saver may also be operated to offer a solution to the problem of shortened lifespan of a light emitting device of the display apparatus, the burn-in issues, etc.

However, when a screen saver operates irrespective of the user's intention or the screen saver operates regardless of the operation (current state) of the display apparatus, there is a problem in that it causes trouble and inconvenience.

In order to prevent such inconvenience, according to the prior art, when operating a screen saver, a method of inquiring whether to run the screen saver to an application (or program) is used, but there is a problem in that it is not easy to monitor which application to which such an inquiry should be made.

Accordingly, there is a demand for a method for more simply determining whether to operate a screen saver in relation to the user's intention and the operation of the apparatus.

SUMMARY

The present disclosure is to provide a display apparatus that operates a screen saver in consideration of a user's intention and a current state of the apparatus and a controlling method thereof.

A display apparatus according to an embodiment includes: a display; and a processor configured to count time for displaying a screen saver after a user input is received, and based on the counted time corresponding to a threshold time, control the display to display the screen saver, wherein the processor is further configured to: identify state information related to an operation of a first application that is being executed on the display apparatus; adjust a setting value related to an interface application that processes a reset request for resetting the counted time based on the state information; and based on the reset request being received from the first application, select one of 'accept' or 'ignore' for the reset request through the interface application according to the setting value.

A display apparatus according to an embodiment includes a display and a processor configured to count a time for operating a screen saver after a user input is received, and based on the counted time corresponding to a threshold time, control the display to display a screen corresponding to the screen saver by operating the screen saver, and the processor is configured to identify state information related to an operation of an application that is being executed on the display apparatus, adjust a setting value related to an interface application that processes a reset request for resetting the counted time based on the state information, and based on the reset request being received from the application, select one of 'accept' or 'ignore' for the reset request through the interface application according to the setting value.

The processor may be configured to, based on the interface application accepting the reset request according to the setting value, reset the counted time and recount a time for operating the screen saver, and based on the recounted time corresponding to the threshold time, operate the screen saver.

The processor may be configured to, based on the interface application ignoring the reset request according to the setting value, maintain counting without resetting the counted time, and based on the counted time corresponding to the threshold time, operate the screen saver.

The state information may include information on a size of the application that is being executed on a screen of the display, and the processor may be configured to, based on identifying that the size of the application that is being executed is equal to or greater than a threshold size based on the state information, adjust the setting value so that the interface application accepts the reset request, and based on identifying that the size of the application that is being executed is less than a threshold size, adjust the setting value so that the interface application ignores the reset request.

The state information may include whether the application that is being executed is reproducing a video content, based on identifying that the application that is being executed is reproducing the video content based on the state information, the setting value may be adjusted so that the interface application accepts the reset request, and based on identifying that the application that is being executed is not reproducing the video content based on the state information, the setting value may be adjusted so that the interface application ignores the reset request.

The application may be a video application that reproduces a video content, and the state information may include information regarding a current reproduction section of a video content reproduced by the video application, based on identifying that a current reproduction section of a video content that is being reproduced by the video application is a predetermined time section based on the state information, the setting value may be adjusted so that the interface application accepts the reset request, and based on identifying that a current reproduction section of a video content that is being reproduced by the video application is not a predetermined time section based on the state information, the setting value may be adjusted so that the interface application ignores the reset request.

The processor may be configured to set the application to transmit the reset request in a period less than the threshold time.

The processor may be configured to, based on identifying that at least one application that is being executed in the display apparatus corresponds to a specific application, not operate the screen saver regardless of whether the reset request is received.

The processor may be configured to, based on identifying that the at least one application that is being executed corresponds to the specific application or the reset request is received from the at least one application that is being executed, execute a screen production function on areas excluding an area in which the at least one application that is being executed is displayed on a screen of the display.

The processor may be configured to, based on a subsequent user input being received after the user input is received, reset the counted time, recount a time for operating the screen saver after receiving the subsequent user input, and based on the recounted time corresponding to the threshold time, operate the screen saver.

A controlling method of a display apparatus of an embodiment includes: counting time for displaying a screen saver after a user input is received; and based on the counted time corresponding to a threshold time, displaying the screen saver, wherein the counting includes: identifying state information related to an operation of a first application that is being executed on the display apparatus; adjusting a setting value related to an interface application that processes a reset request for resetting the counted time based on the state information; and based on the reset request being received from the first application, selecting one of 'accept' or 'ignore' for the reset request through the interface application according to the setting value.

A controlling method of a display apparatus according to an embodiment includes counting a time for operating a screen saver after a user input is received, and based on the counted time corresponding to a threshold time, displaying a screen corresponding to the screen saver by operating the screen saver, and the counting may include identifying state information related to an operation of an application that is being executed on the display apparatus, adjusting a setting value related to an interface application that processes a reset request for resetting the counted time based on the state information, and based on the reset request being received from the application, selecting one of 'accept' or 'ignore' for the reset request through the interface application according to the setting value.

The counting may include, based on the interface application accepting the reset request according to the setting value, resetting the counted time, and based on the recounted time corresponding to the threshold time, operating the screen saver.

The displaying may include, based on the interface application ignoring the reset request according to the setting value, maintaining counting without resetting the counted time, and based on the counted time corresponding to the threshold time, operating the screen saver.

The state information may include information on a size of the application that is being executed on a screen of the display, and the adjusting may include, based on identifying that the size of the application that is being executed is equal to or greater than a threshold size based on the state information, adjusting the setting value so that the interface application accepts the reset request, and based on identifying that the size of the application that is being executed is less than a threshold size, adjusting the setting value so that the interface application ignores the reset request.

The state information may include whether the application that is being executed is reproducing a video content, and the adjusting may include, based on identifying that the application that is being executed is reproducing the video content based on the state information, adjusting the setting value so that the interface application accepts the reset request, and based on identifying that the application that is being executed is not reproducing the video content based on the state information, adjusting the setting value so that the interface application ignores the reset request.

The application may be a video application that reproduces a video content, and the state information may include information regarding a current reproduction section of a video content reproduced by the video application, based on identifying that a current reproduction section of a video content that is being reproduced by the video application is a predetermined time section based on the state information, the setting value may be adjusted so that the interface application accepts the reset request, and based on identifying that a current reproduction section of a video content that is being reproduced by the video application is not a predetermined time section based on the state information, the setting value may be adjusted so that the interface application ignores the reset request.

The method may further include setting the application to transmit the reset request in a period less than the threshold time.

The method may further include, based on identifying that at least one application that is being executed in the display apparatus corresponds to a specific application, not operating the screen saver regardless of whether the reset request is received.

The method may further include, based on identifying that the at least one application that is being executed corresponds to the specific application or the reset request is received from the at least one application that is being executed, executing a screen production function on areas excluding an area in which the at least one application that is being executed is displayed on a screen of the display.

The method may further include, based on a subsequent user input being received after the user input is received, resetting the counted time, recounting a time for operating the screen saver after receiving the subsequent user input, and based on the recounted time corresponding to the threshold time, operating the screen saver.

According to various embodiments, there is no need to monitor which application from among a plurality of applications to inquire whether a screen saver should be operated, and it is possible to operate the screen saver according to a user's intention and the current state of the display apparatus in a simpler manner.

DETAILED DESCRIPTION

Figure 1:
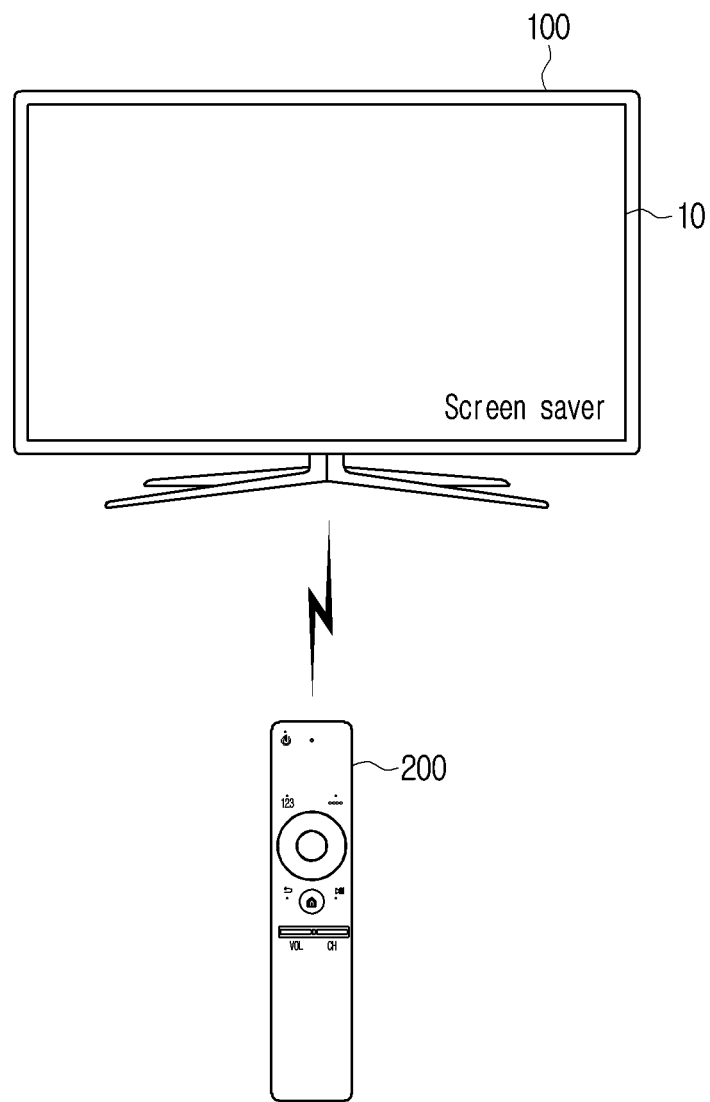
FIG. 1 is a view provided to explain a display apparatus that operates a screen saver according to an embodiment.

The terms used in the disclosure will be described briefly, and the present disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to specific embodiments, but includes all modifications, equivalents, and substitutions without departing from the scope and spirit of the disclosure. In case that it is decided that the detailed description of the known art related to the disclosure may obscure the gist of the disclosure, a detailed description thereof will be omitted.

Terms 'first', 'second', and the like, may be used to describe various components, but the components are not to be construed as being limited by these terms. The terms are used only to distinguish one component from another component.

Singular forms used herein are intended to include plural forms unless explicitly indicated otherwise. It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not illustrated) except for a 'module' or an 'unit' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments provided in the present specification. In addition, in the drawings, portions unrelated to the description are omitted to clearly describe the disclosure, and similar portions are denoted by similar reference numerals throughout the specification.

FIG. 1 is a view provided to explain a display apparatus that operates and displays a screen saver according to an embodiment.

Referring to FIG. 1, a display apparatus 100 may display video data. The display apparatus 100 may be implemented as a TV, but is not limited thereto. The display apparatus 100 can be applicable to any device having a display function such as a video wall, a large format display (LFD), a digital signage, a Digital Information Display (DID), a projector display, etc. In addition, the display apparatus 100 may be implemented as various types of displays such as a liquid crystal display (LCD), an organic light-emitting diode (OLED), a Liquid Crystal on Silicon (LCoS), a Digital Light Processing (DLP), a quantum dot (QD) display panel, quantum dot light-emitting diodes (QLED), etc.

The display apparatus according to an embodiment may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, medical devices, cameras, virtual reality (VR) implementation devices, or wearable devices. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to some embodiments, the display apparatus 100 may include at least one of televisions (TVs), digital versatile disc (DVD) players, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the display apparatus 100 may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices, etc.), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs) of banking institutions, points of sales (POSs) of stores, or internet of things (e.g., light bulbs, various sensors, sprinkler devices, fire alarms, thermostats, street lamps, toasters, exercise equipment, hot water tanks, heaters, boilers, and the like).

According to an embodiment, a plurality of display modules may be combined to implement one display apparatus (that is, the display apparatus 100).

The display apparatus 100 according to an embodiment may include a plurality of self-luminous elements. Here, the self-luminous element may be at least one of a Light Emitting Diode (LED) or a micro LED.

For example, the LED may include a RED LED, a GREEN LED and a BLUE LED. In addition, the LED may further include a White LED in addition to the RGB LED. According to an embodiment, the micro LED is an LED having a size of about 5 to 100 micrometers, and it is a small light emitting element that emits light by itself without a color filter.

Accordingly, the display apparatus 100 may receive a user input (or a control signal corresponding to the user input) from an external device (e.g., a remote control device 200), or may receive a user input from various types of input devices (e.g., a touch screen, a keyboard, a mouse, etc.).

The display apparatus 100 according to an embodiment may operate and display a screen saver when a user input is not received for a threshold time.

According to an embodiment, the display apparatus 100 may display a screen saver in order to protect a display provided in the display apparatus 100 (e.g., in order to resolve a burn-in issue of a panel), by displaying a screen 10 corresponding to the screen saver.

For example, the screen 10 corresponding to the screen saver may mean a screen or screens, or an image or images, that are pre-stored by the manufacturer or saved by a user in the display apparatus 100, etc., in order to mitigate the burn-in of a plurality of self-luminous elements included in the display apparatus 100.

In addition, the display apparatus 100 may display the screen saver, i.e., display the screen 10 corresponding to the screen saver, by displaying the screen saver in order to efficiently manage power consumption of the display apparatus 100.

For example, there is a need for efficiently managing power consumption of the display apparatus 100 as the display apparatus 100 has higher specification, higher performance, higher output, and the like.

According to an embodiment, when the display apparatus 100 does not operate for a predetermined time (or a threshold time) or a user input is not received in the display apparatus 100 for a predetermined time, the display apparatus 100 may operate or switch to a mode for minimizing power consumption. Here, the mode for minimizing power consumption may include a standby mode, a power saving mode, a mode for operating a screen saver, and the like.

The screen 10 corresponding to the screen saver is a screen for minimizing power consumption of a display (e.g., a panel) provided in the display apparatus 100, and may include a still screen or an animation screen.

The processor provided in the display apparatus 100 according to an embodiment may count time for operating the screen saver after a user input is received, and when the counted time corresponds to a threshold time, may display a screen corresponding to the screen saver by operating the screen saver, i.e., display the screen saver.

Here, the threshold time, e.g., timeout time, inactivity time, etc., is a time arbitrarily set by a manufacturer, a user, and the like, and can be changed. For example, when the threshold time is 5 minutes, the processor counts time for displaying the screen saver after a user input is received through the remote control device 200 and when the counted time reaches the threshold time, that is, 5 minutes, the processor may display the screen 10 by operating the screen saver, i.e., display the screen saver.

Meanwhile, according to various embodiments, the display apparatus 100 may not display the screen saver even if a user input is not received for a threshold time. Hereinafter, an embodiment for not displaying the screen saver will be described through various drawings.

Figure 2:
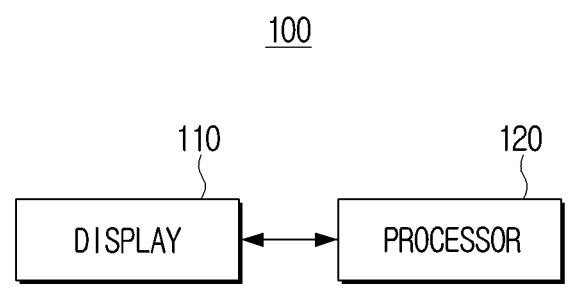
FIG. 2 is a block diagram provided to explain configuration of a display apparatus according to an embodiment.

FIG. 2 is a block diagram provided to explain configuration of a display apparatus according to an embodiment.

According to FIG. 2, the display apparatus 100 includes a display 110 and a processor 120.

The display 110 according to an embodiment may be implemented as various types of displays such as liquid crystal display (LCD), organic light-emitting diode (OLED), Liquid Crystal on Silicon (LCoS), Digital Light Processing (DLP), quantum dot (QD) display panel, quantum dot light-emitting diodes (QLED), Micro light-emitting diodes (μLED), Mini LED, etc. Meanwhile, the display 110 may be implemented as a touch screen combined with a touch sensor, a flexible display, a rollable display, a 3D display, a display in which a plurality of display modules are physically connected, etc.

The processor 120 is electrically connected to a memory (not illustrated), and controls the overall operations of the display apparatus 100.

According to an embodiment, the processor 120 may be implemented as a digital signal processor (DSP) for processing digital image signals, a microprocessor, or a time controller (TCON), but is not limited thereto. The processor 120 may include at least one of a central processing unit (CPU), a micro controller unit (MCU), a micro processing unit (MPU), a controller, an application processor (AP), a communication processor (CP), an ARM processor, or an Artificial Intelligence (AI) processor, or may be defined as the corresponding term. Further, the processor 120 may be implemented as a System on Chip (SoC) integrated with a processing algorithm, a large scale integration (LSI), or in the form of a field programmable gate array (FPGA). In addition, the processor 120 may perform various functions by executing computer executable instructions stored in a memory 130.

Firstly, the processor 120 according to an embodiment may count time for operating the screen saver after a user input is received, and when the counted time corresponds to the threshold time, may control the display 110 to display a screen corresponding to the screen saver.

When a reset request regarding the counted time is received from an application that is being executed in the display apparatus 100, the processor 120 according to an embodiment may reset the counted time. Subsequently, the processor 120 may recount time for operating the screen saver.

For example, the processor 120 may count time for operating the screen saver after a user input is received (that is, time for operating the screen saver may sequentially increase from 0 second).

Subsequently, when a reset request for the counted time is received from the application, the processor 120 may reset the counted time and recount time for displaying the screen saver (that is, time for displaying the screen saver may sequentially increase from 0 second again).

Subsequently, when the recounted time corresponds to the threshold time (e.g., when the recounted time reaches the threshold time), the processor 120 may control the display 110 to display a screen corresponding to the screen saver.

Figure 3:
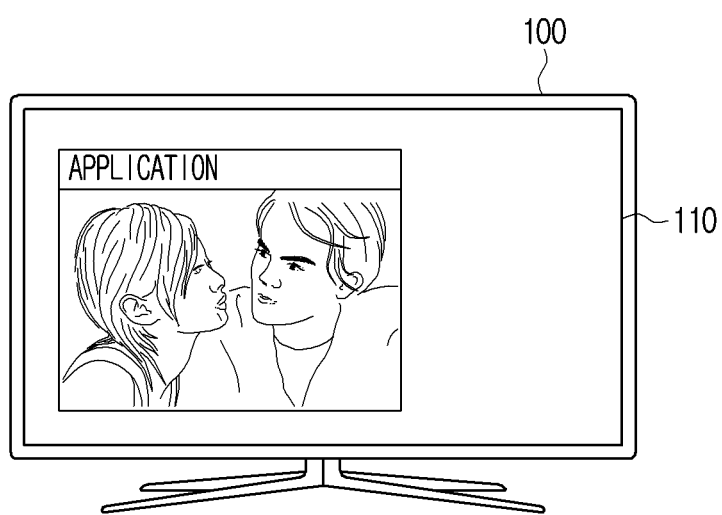
FIG. 3 is a view provided to explain a reset request of an application according to an embodiment.
Figure 3:
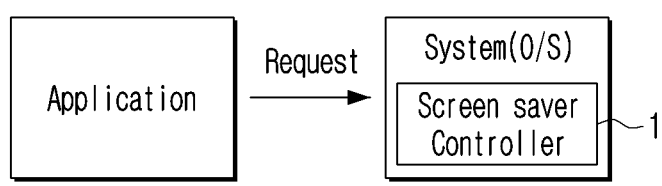

FIG. 3 is a view provided to explain a reset request of an application according to an embodiment.

Referring to FIG. 3, the application that is being executed in the display apparatus 100 may transmit a reset request for the counted time for displaying the screen saver.

For example, the display apparatus 100 may use a standardized general-purpose system (e.g., a general-purpose operating system (O/S)), or a dedicated system of the display apparatus 100 (e.g., a dedicated O/S). The system used by the display apparatus 100 may provide an environment in which various services and various applications can be added, deleted, amended, or updated.

The application according to an embodiment means a program capable of performing various functions according to the purpose of the application, and can be implemented as various programs such as content player, e-mail, web browsing, banking, game, word processor, photo editing, etc.

For example, the application may be a content player that outputs video contents, and may transmit a reset request so that the video contents are reproduced seamlessly without displaying the screen saver even if there is no user input (e.g., even if a user input is not received for the threshold time) while the video contents are reproduced.

For example, the content player may transmit a reset request in a period less than the threshold time, and since the processor 120 resets counted time according to a reset request before the amount of time during which a user input is not received (e.g., the counted time) reaches the threshold time, the processor 120 may not display the screen saver.

In addition, the system used by the display apparatus 100 may include a management application (management program, system manager), etc. for smoothly operating various services and applications. For example, the system used by the display apparatus 100 may include a screen saver controller 1, and the system may count time for displaying the screen saver using the screen saver controller 1 and identify whether the counted time corresponds to a threshold time. According to an embodiment, when the counted time corresponds to the threshold time, the screen saver controller 1 may display the screen saver.

The application that is being executed in the display apparatus 100 according to an embodiment may transmit a reset request for the counted time for displaying the screen saver to the screen saver controller 1. Subsequently, the screen saver controller 1 may reset the counted time according to the reset request.

Since the counted time is reset according to the reset request, even if a user input is not received during the threshold time, the processor 120 may not display the screen saver.

Figure 4:
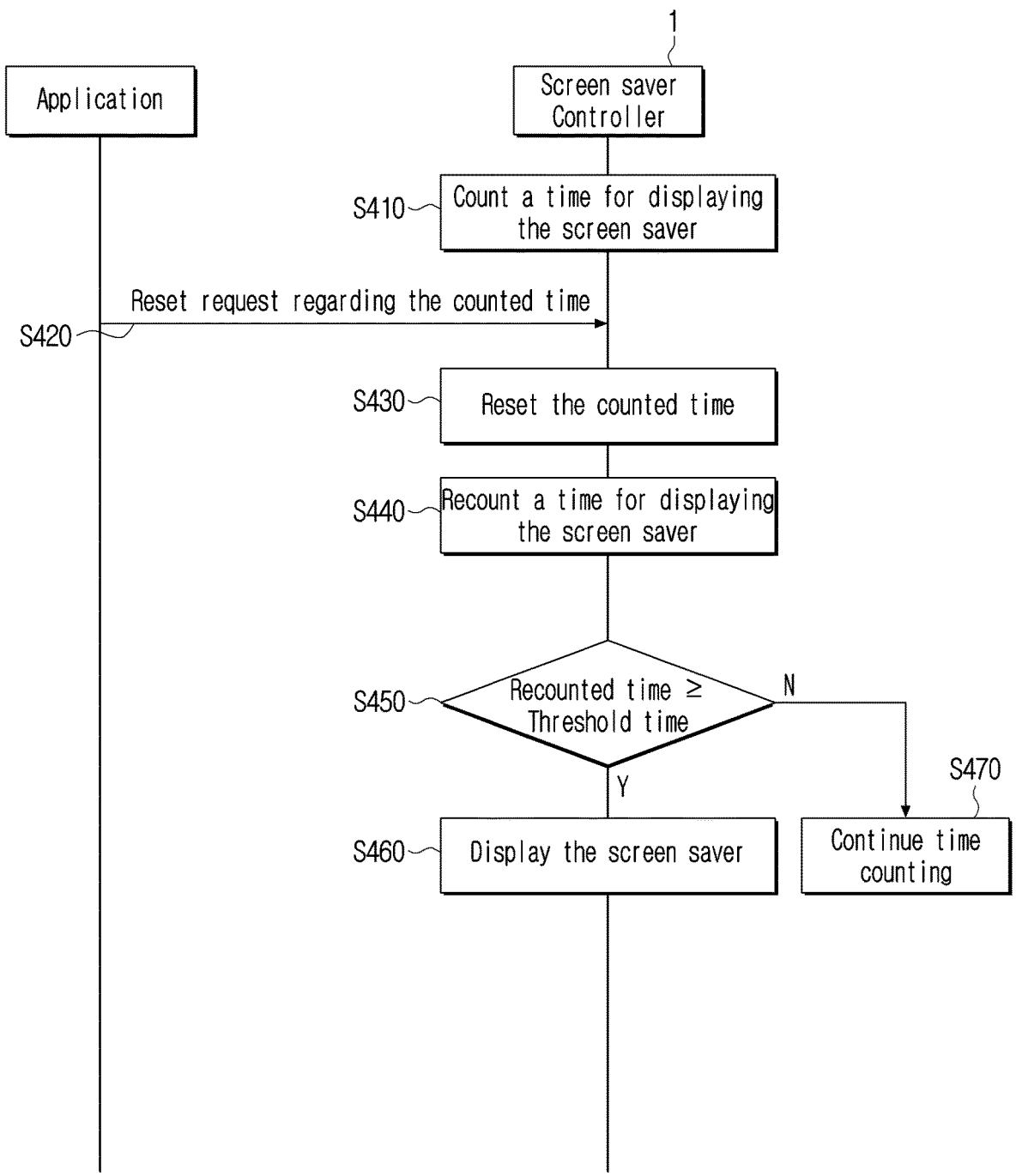
FIG. 4 is a sequence view provided to explain a screen saver controller according to an embodiment.

FIG. 4 is a sequence view provided to explain a screen saver controller according to an embodiment.

Firstly, the screen saver controller 1 according to an embodiment counts time for displaying the screen saver after a user input is received (S410).

According to an embodiment, the screen saver controller 1 may receive a reset request for the counted time from the application that is being executed in the display apparatus 100 (S420).

Subsequently, the screen saver controller 1 may reset the counted time according to the reset request (S430).

For example, when a user input is received, the screen saver controller 1 may reset the counted time, and when the counted time reaches a threshold time as a user input is not being received during the threshold time, may display the screen saver.

According to an embodiment, the screen saver controller 1 may reset the counted time according to a reset request transmitted by the application even if a user input is not received.

Subsequently, the screen saver controller 1 may recount time for operating the screen saver (S440). For example, the screen saver controller 1 may count time for operating the screen saver again from 0 second after a reset request is received.

According to an embodiment, when the recounted time corresponds to a threshold time, (S450: Y), the screen saver controller 1 may display the screen saver (S460). In another example, when the recounted time does not correspond to the threshold time (S450: N), the screen saver controller 1 may continue counting of the time for displaying the screen saver (S470). In other words, the screen saver controller 1 may keep counting and increasing the time for displaying the screen saver.

Figure 5:
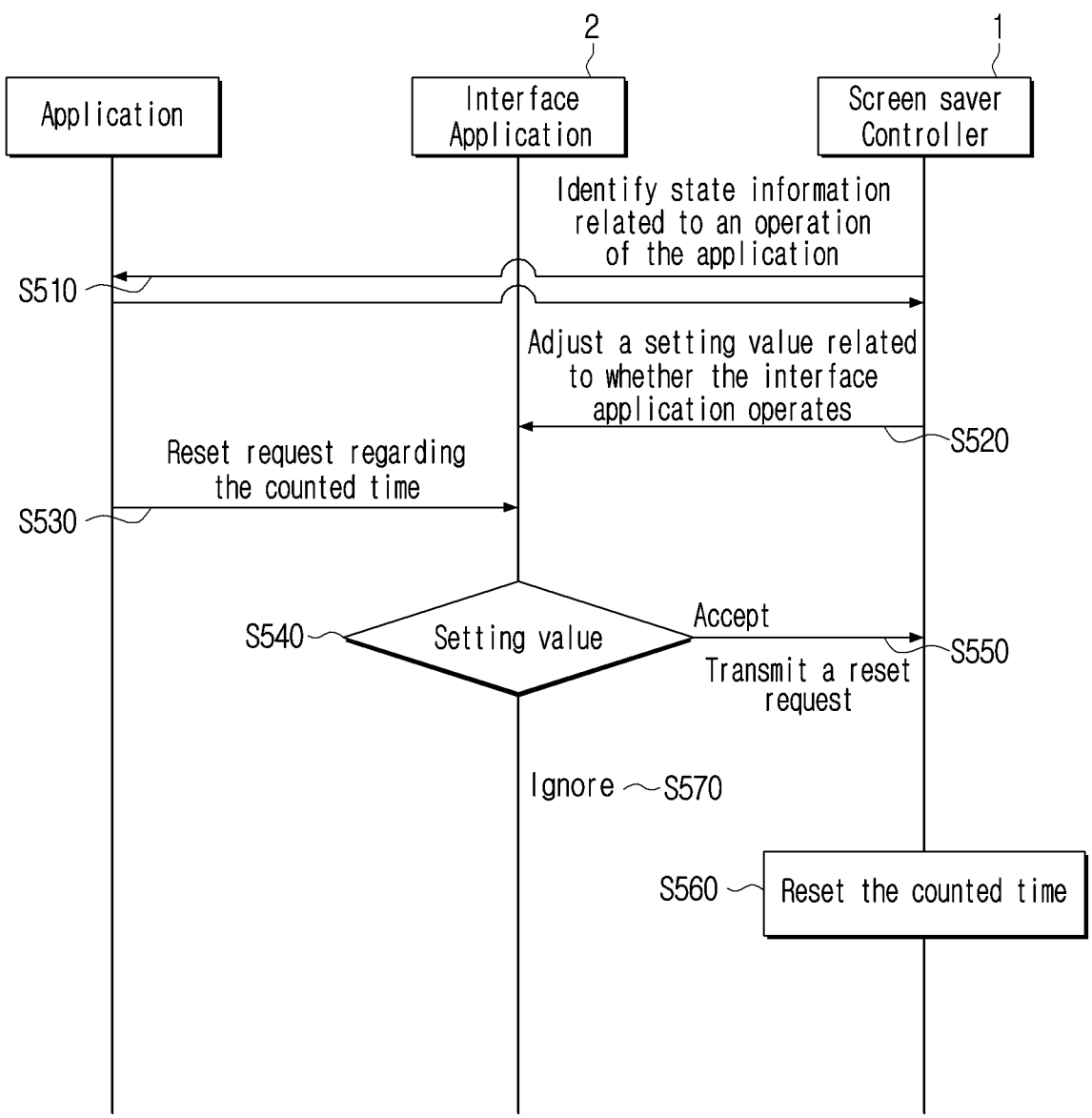
FIG. 5 is a sequence view provided to explain an interface application according to an embodiment.

FIG. 5 is a sequence view provided to explain an interface application according to an embodiment.

Firstly, the screen saver controller 1 (or the processor 120) according to an embodiment may identify state information related to an operation of the application that is being executed (S510).

Subsequently, the screen saver controller 1 may select one of 'accept' or 'ignore' regarding a reset request based on the state information. For example, when the screen saver controller 1 selects 'accept' regarding a reset request based on the state information, the screen saver controller 1 may reset the counted time according to the reset request received from the application.

In another example, when the screen saver controller 1 selects 'ignore' regarding a reset request based on the state information, the screen saver controller 1 may ignore the reset request received from the application and may not reset the counted time.

For example, the screen saver controller 1 includes an interface application 2, and may select one of 'accept' or 'ignore' regarding a reset request using the interface application 2.

In another example, the screen saver controller 1 may set the setting value of the interface application 2 that is distinguished from the screen saver controller 1, and the interface application 2 may select one of 'accept' or 'ignore' regarding a reset request according to the setting value.

Here, the interface application 2 may be one of various management applications (management program, system manager) running in the system, just like the screen saver controller 1. The interface application 2 is a term for convenience of explanation, and it can be called in various ways such as a valve interface, a reset request processing program, etc.

According to an embodiment, the screen saver controller 1 may adjust a setting value related to whether the interface application 2 that processes a reset request operates based on the state information (S520). For example, when the screen saver controller 1 adjusts a setting value so that the interface application 2 operates, the interface application 2 may accept a reset request received from the application.

In another example, when the screen saver controller 1 adjusts a setting value so that the interface application 2 does not operate, the interface application 2 may ignore a reset request received from the application.

In another example, the screen saver controller 1 may adjust a setting value so that one of 'accept' or 'ignore' regarding a reset request is selected, rather than to decide whether the interface application 2 operates.

For example, when the screen saver controller 1 adjusts a setting value so that the interface application 2 accepts a reset request, the interface application 2 may accept a reset request received from the application. In another example, when the screen saver controller 1 adjusts a setting value so that the interface application 2 ignores a reset request, the interface application 2 may ignore a reset request received from the application.

According to an embodiment, the application may transmit a reset request regarding a counted time (S530). When a reset request is received, the interface application 2 may accept or ignore the reset request according to a setting value (S540).

Firstly, when the interface application 2 accepts the reset request based on a setting value (S540), the screen saver controller 1 may receive the reset request (S550) and reset the counted time (S560).

In another example, when the interface application 2 ignores the reset request based on a setting value (S570), the screen saver controller 1 may not receive the reset request and keep counting without resetting the counted time. In addition, when the counted time corresponds to a threshold time, the screen saver controller 1 may operate the screen saver.

Figure 6:
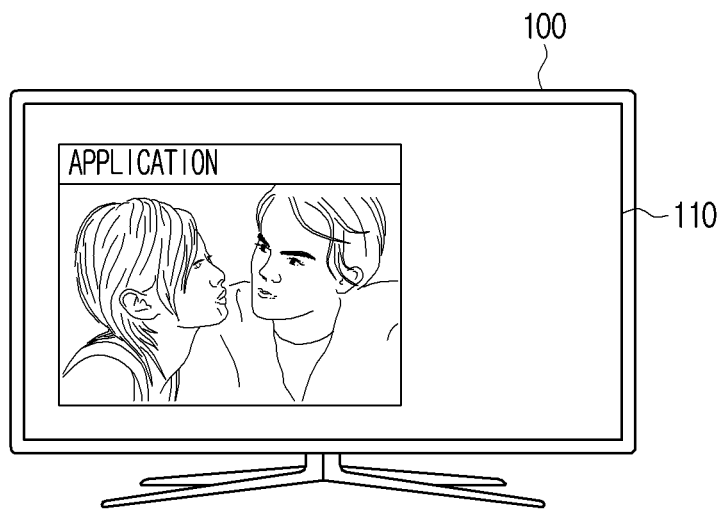
FIG. 6 is a view provided to explain acceptance of a reset request according to an embodiment.
Figure 6:
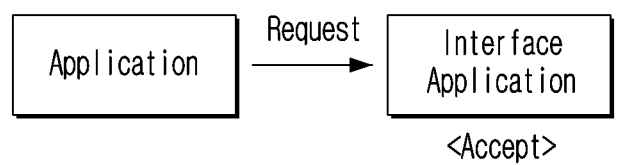

FIG. 6 is a view provided to explain acceptance of a reset request according to an embodiment.

According to an embodiment, the screen saver controller 1 may identify state information related to an operation of the application that is being executed.

Here, the state information may include information on a size of the application that is being executed on the screen of the display 110 (that is, information on a size of an area where the application is displayed on the screen of the display 110). Referring to FIG. 6, when the size of the screen where the application that is being executed is displayed is equal to or greater than a predetermined size, the screen saver controller 1 may adjust a setting value of the interface application 2 so that a reset request transmitted by the application is accepted.

In another example, the state information may include whether the application is reproducing a video content. For example, the application may be a web browser, and the web browser may connect to various types of video content providing sites or video content streaming sites and reproduce video contents. The screen saver controller 1 may identify whether the web browser is reproducing a video content based on the state information of the application.

According to an embodiment, when it is identified that the application is reproducing a video content based on the state information, the screen saver controller 1 may adjust a setting value so that the interface application 2 accepts a reset request. The interface application 2 may accept the reset request transmitted by the application that is reproducing a video content so that the screen saver does not operate according to the setting value, and the screen saver controller 1 may reset the counted time.

In another example, when it is identified that the application is not reproducing a video content based on the state information, the screen saver controller 1 may adjust a setting value so that the interface application 2 ignores a reset request. The interface application 2 may ignore the reset request transmitted by the application that is not reproducing a video content, and the screen saver controller 1 may continue the counted time without resetting it.

In another example, the state information may include whether a current reproduction section of the content that is being reproduced by the application corresponds to a predetermined time section.

For example, the application that is being executed may be a video application (or a content player) that reproduces a video content. In this case, the state information may include information regarding the current reproduction section of the video content that is being reproduced by the video application.

When the current reproduction section of the video content is a predetermined time section, the screen saver controller 1 may adjust a setting value so that the interface application 2 accepts a reset request. For example, an important time section or a highlight time section may be predetermined according to metadata of the video content or a content provider, and when the current reproduction section of the video content corresponds to the predetermined time section, the interface application 2 accepts a reset request so that the screen saver does not operate according to the setting value, and the screen saver controller 1 may reset the counted time.

The above-described state information is only an example and is not limited thereto. For example, the processor 120 may control the display 110 to display a UI for setting whether the application transmits a reset request or a UI for setting whether to accept or ignore the reset request by the application, and the processor 120 may set whether the application transmits a reset request or set whether to accept or ignore the reset request transmitted by the application based on a user input for the UI.

Figure 7:
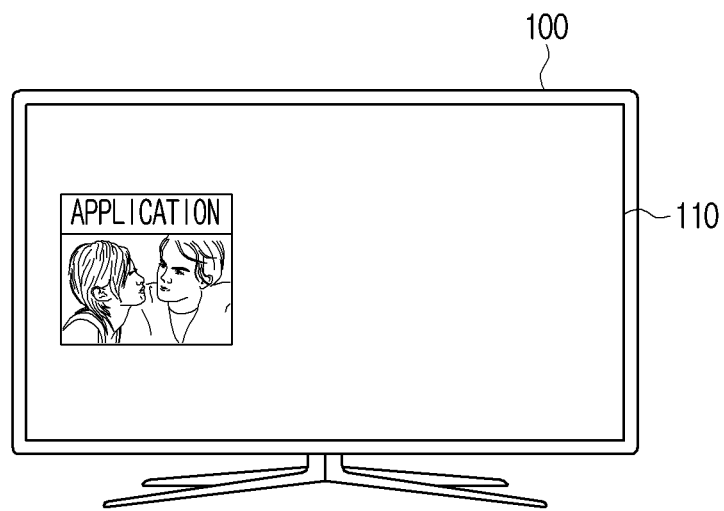
FIG. 7 is a view provided to explain ignoring of a reset request according to an embodiment.
Figure 7:
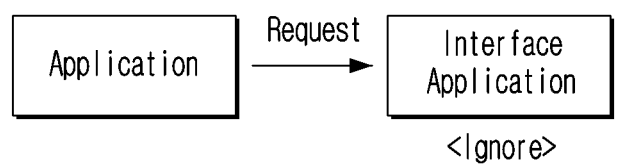

FIG. 7 is a view provided to explain ignoring of a reset request according to an embodiment.

Referring to FIG. 7, when the size of the screen of the application that is being executed is less than a predetermined size, the screen saver controller 1 may adjust a setting value of the interface application 2 so that a reset request transmitted by the application is ignored.

For example, when the size of the screen of the application is less than a predetermined size, the processor 120 may determine that efficiently managing power consumption or protecting light-emitting elements constituting the display 110 by providing a screen corresponding to the screen saver needs to be prioritized than resetting the counted time by accepting the reset request transmitted by the application.

In another example, as described above, when it is identified that the application that is being executed does not reproduce a video content based on the state information, the screen saver controller 1 may adjust a setting value so that the interface application 2 ignores the reset request. The interface application 2 may ignore the reset request transmitted by the application that is not reproducing a video content, and the screen saver controller 1 may continue the counted time without resetting it.

In another example, when the application that is being executed is a video application (or a content player) that reproduces a video content, the screen saver controller 1 may identify whether the current reproduction section of the video content is a predetermined time section based on the state information.

When the current reproduction section of the video content is not a predetermined time section, the screen saver controller 1 may adjust a setting value so that the interface application 2 ignores the reset request. Accordingly, when the current reproduction section of the video content does not correspond to a predetermined time section, the interface application 2 may ignore the reset request so that the screen saver operates according to a setting value, and the screen saver controller 1 may not reset the counted time.

Figure 8:
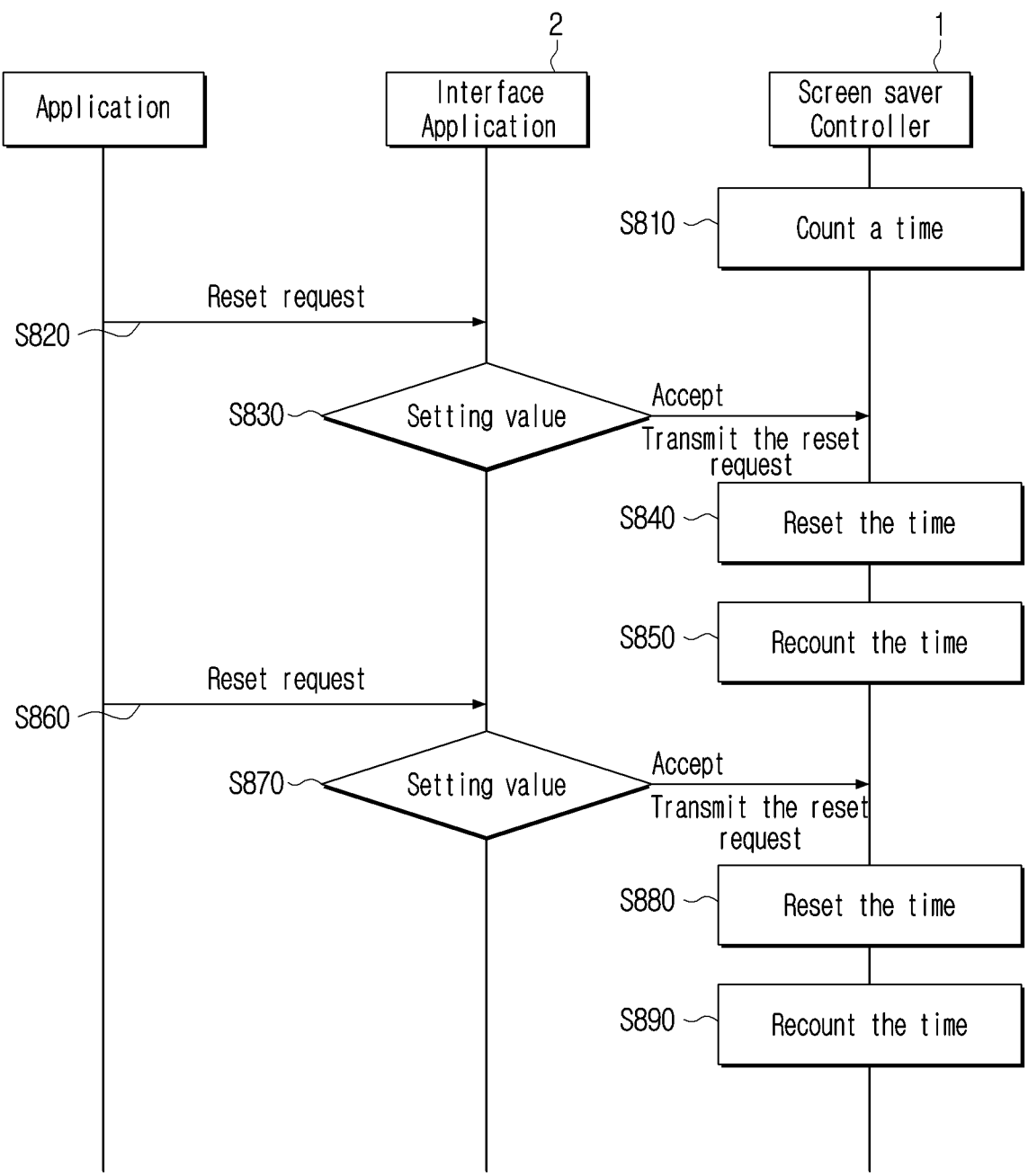
FIG. 8 is a sequence view provided to explain a cycle of transmission of a reset request according to an embodiment.

FIG. 8 is a sequence view provided to explain a cycle of transmission of a reset request according to an embodiment.

For convenience of explanation, it is assumed that the interface application is set to accept a reset request and an application that is being executed transmits a reset request periodically.

Here, the application that is being executed in the display apparatus 100 means an application located in the foreground, but is not limited thereto. The application that is being executed in the display apparatus 100 may also include an application located in the background.

According to an embodiment, an application transmits a reset request (S820).

The interface application 2 may accept the reset request, and transmit the reset request to the screen saver controller 1 (S830). According to the reset request, the screen saver controller 1 may reset the counted time (S840), and recount time for displaying the screen saver (S850).

Meanwhile, the application may transmit a reset request again (S860). Here, the time difference between the operation of S820 and the operation of S860 may be less than a threshold time for which the screen saver controller 1 displays the screen saver.

For example, it may be assumed that when a user input is not received for a threshold time (e.g., 5 minutes), the screen saver controller 1 displays the screen saver. The screen saver controller 1 may recount time for displaying the screen saver after resetting the counted time in S840 and S850, and operate the screen saver when the recounted time reaches a threshold time. According to an embodiment, before the recounted time reaches the threshold time, the recounted time must be reset by receiving a reset request from the application and thus, the application needs to transmit a reset request in a period less than the threshold time.

According to an embodiment, the screen saver controller 1 may identify a time period during which the application that transmits a reset request transmits a reset request, and when the identified time period exceeds a threshold time, the screen saver controller 1 may set the application to transmit a reset request in a period less than the threshold time.

Meanwhile, the screen saver controller 1 recounts time for displaying the screen saver after resetting the counted time in S840 and S850, and when a user input is received before the recounted time reaches the threshold time, may reset the recounted time.

In another example, when the recounted time reaches the threshold time, the screen saver controller 1 may display the screen saver.

Figure 9:
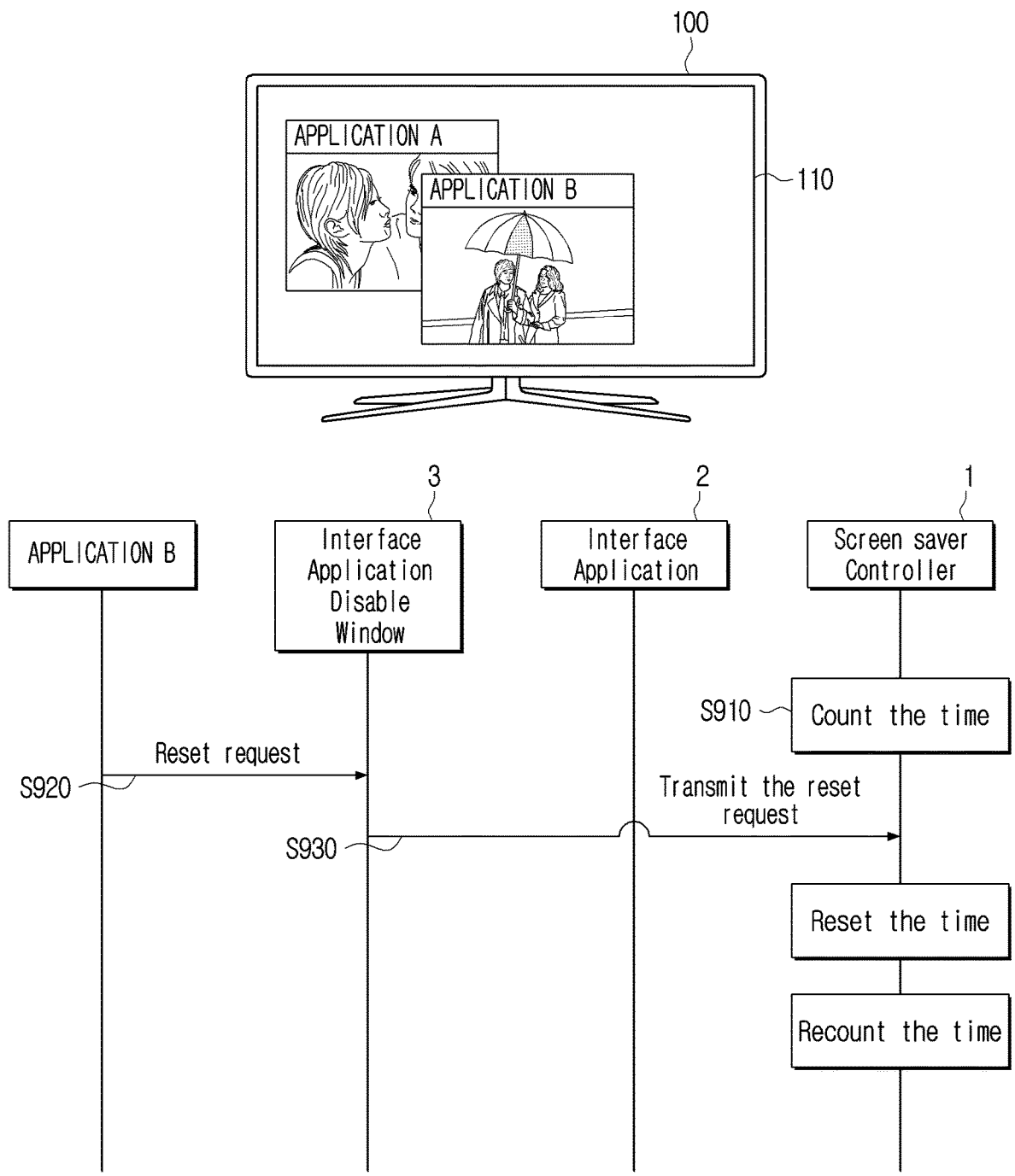
FIG. 9 is a view provided to explain a specific application according to an embodiment.

FIG. 9 is a view provided to explain a specific application according to an embodiment.

Referring to FIG. 9, when it is identified that at least one application that is being executed in the display apparatus 100 corresponds to a specific application, the processor 120 may not display the screen saver regardless of whether a reset request is received.

For example, the screen saver controller 1 (or the processor 120) may include a list of specific applications for not displaying the screen saver. When it is identified that at least one application that is being executed in the display apparatus 100 is included in the specific applications according to the list, the screen saver controller 1 may not display the screen saver.

In another example, the screen saver controller 1 may include an interface application disable window 3, and the interface application disable window 3 may inactivate the operation of the interface application 2.

For example, when it is identified that at least one application that is being executed in the display apparatus 100 is included in the specific applications according to the list, the screen saver controller 1 may use the interface application disable window 3.

When a reset request is received from the application (S920), the interface application disable window 3 may transmit the reset request to the screen saver controller 1 regardless of a setting value of the interface application 2 (i.e., by skipping the interface application 2) (S930).

Accordingly, even if the interface application 2 is set to ignore a reset request, the interface application disable window 3 may transmit the reset request received from the application to the screen saver controller 1 (S930), and recount time (S950) after resetting the counted time (S940).

Here, the interface application disable window 3 may be one of various management applications (a management program, a system manager, etc.) running in a system, such as the screen saver controller 1 and the interface application 2. The interface application disable window 3 is a term used for convenience of explanation, and it may be referred to as various terms such as a valve interface, an inactivation program, etc.

Meanwhile, according to various embodiments, each of the screen saver controller 1, the interface application 2 and the interface application disable window 3 operates under the control of the processor 120 and thus, the operation of each of the screen saver controller 1, the interface application 2 and the interface application disable window 3 in the above-described example may be implemented as the operation of the processor 120 or each of the various operations of the processor 120 may be implemented by being divided into the operation of each of the screen saver controller 1, the interface application 2 and the interface application disable window 3.

Here, the specific application may mean an application that transmits a request for activating the interface application disable window 3, an application registered with a list included in the screen saver controller 1, and the like. In another example, the specific application may mean an application identified by the screen saver controller 1 as corresponding to a specific type. For example, when the application that is being executed in the display apparatus 100 is a game application, a content player, or the like, the screen saver controller 1 may directly receive a reset request sent by the application (for example, without going through the interface application 2) using the interface application disable window 3.

Figure 10:
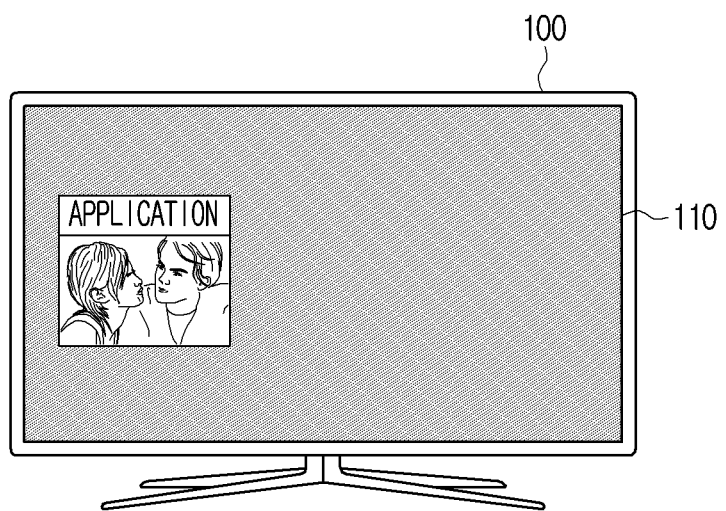
FIG. 10 is a view provided to explain a screen protection function according to an embodiment.

FIG. 10 is a view provided to explain a screen protection function according to an embodiment.

The screen saver controller 1 (or the processor 120) according to an embodiment, when it is identified that at least one application that is being executed corresponds to a specific application, may not display the screen saver regardless of whether a reset request is received.

The screen saver controller 1 (or the processor 120) according to another embodiment may execute a screen protection function instead of displaying the screen saver.

In another example, when a reset request is received from at least one application that is being executed, the screen saver controller 1 may execute a screen protection function in an area except for the area where at least one application that is being executed on the screen of the display 110 is displayed.

For example, the screen saver controller 1 may execute a screen protection function when the interface application ignores a reset request according to a setting value and a reset request is received from the at least one application that is being executed.

Referring to FIG. 10, the screen saver controller 1 may execute a screen protection function in an area except for the area where at least one application (e.g., a specific application) that is being executed on the screen of the display 110.

Here, the screen protection function may mean a mode for adjusting the luminance, chroma, brightness, etc. of the remaining area except for the area where at least one application (e.g., a specific application) that is being executed is displayed on the screen of the display 110 to a preset value or less.

For example, the screen protection function may prevent the lifespan of an element from being shortened by adjusting the luminance of the remaining area except for the area where the application providing a video content (e.g., a specific application) on the screen of the display 110 is displayed to a preset value or less or by turning off a self-luminance element corresponding to the remaining area, there by efficiently managing power consumption.

Figure 11:
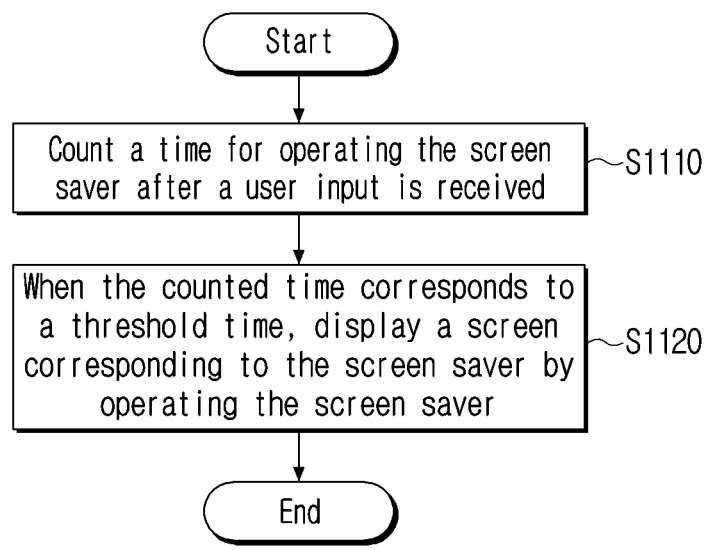
FIG. 11 is a flowchart provided to explain a controlling method of a display apparatus according to an embodiment.

FIG. 11 is a flowchart provided to explain a controlling method of a display apparatus according to an embodiment.

The controlling method of a display apparatus according to an embodiment may include counting time for displaying the screen saver after a user input is received (S1110).

Subsequently, when the counted time corresponds to a threshold time, the screen saver is operated to display a screen corresponding to the screen saver (S1120).

Here, the counting operation of S1110 includes identifying state information related to the operation of the application that is being executed in the display apparatus, adjusting a setting value related to the interface application that processes a reset request for resetting the counted time based on the state information, and when a reset request is received from the application, selecting one of 'accept' or 'ignore' regarding the reset request through the application.

The counting operation of S1110 according to an embodiment includes, when the interface application accepts the reset request according to a setting value, resetting the counted time, and the displaying operation of S1120 includes, when the recounted time corresponds to a threshold time, displaying the screen saver.

The displaying operation of S1120 according to an embodiment includes, when the interface application ignores the reset request according to a setting value, continuing the counting without resetting the counted time, and when the counted time corresponds to a threshold time, displaying the screen saver.

The state information according to an embodiment includes information on a size of the application that is being executed on the screen of the display apparatus, and the adjusting operation includes when it is identified that the size of the application that is being executed is equal to or greater than a threshold size based on the state information, adjusting a setting value so that the interface application accepts a reset request, and when it is identified that the size of the application that is being executed is less than the threshold size based on the state information, adjusting a setting value so that the interface application ignores a reset request.

The state information according to an embodiment includes information regarding whether the application that is being executed is reproducing a video content, and the adjusting operation includes, when it is identified that the application that is being executed is reproducing a video content based on the state information, adjusting a setting value so that the interface application accepts a reset request, and when it is identified that the application that is being executed is not reproducing a video content, adjusting a setting value so that the interface application ignores a reset request.

The application according to an embodiment is a video application that reproduces a video content, the state information includes information regarding the current reproduction section of the video content that is reproduced in the video application, and the adjusting operation includes, when it is identified that the current reproduction section of the video content that is reproduced in the video application is a predetermined time section based on the state information, adjusting a setting value so that the interface application accepts a reset request, and when it is identified that the current reproduction section of the video content that is reproduced in the video application is not a predetermined time section based on the state information, adjusting a setting value so that the interface application ignores a reset request.

The controlling method according to an embodiment may further include setting the application to transmit a reset request in a period less than a threshold time.

The controlling method according to an embodiment may further include, when it is identified that a specific application is included in at least one application that is being executed in the display apparatus, not displaying the screen saver regardless of whether a reset request is received.

Here, the controlling method may further include executing a screen protection function in an area except for the area where at least one application that is being executed on the screen of the display is displayed.

The controlling method according to an embodiment may further include, when a subsequent user input is received after a user input is received, resetting the counted time, recounting time for displaying the screen saver after the subsequent user input is received, and when the recounted time corresponds to a threshold time, displaying the screen saver.

The various embodiments of the present disclosure may be applied not only to an electronic apparatus but also to various types of electronic apparatuses having a display.

Meanwhile, the above-described various embodiments may be implemented in a recording medium that is readable by a computer or a similar device using software, hardware of a combination thereof. In some cases, the embodiments described in the present disclosure may be implemented by the processor itself. According to software implementation, the embodiments such as procedures and functions described in the present disclosure may be implemented by separate software modules. Each of the software modules may perform one or more functions and operations described in the present disclosure.

Meanwhile, the computer instructions for performing the processing operation of the display apparatus according to the above-described various embodiments of the present disclosure may be stored in a non-transitory computer-readable medium. The computer instructions stored in such a non-transitory computer-readable medium may cause a specific device to perform the processing operation of the display apparatus 100 according to the above-described various embodiments when they are executed by the processor of the specific device.

The non-transitory computer readable medium is not a medium that stores data for a while, such as a register, a cache, a memory, or the like, but means a medium that semi-permanently stores data and is readable by an apparatus. Specifically, the non-transitory readable medium may include a compact disc (CD), a digital versatile disc (DVD), a hard disc, a Blu-ray disc, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A display apparatus comprising:
    a display; and
    a processor configured to count time for displaying a screen saver after a user input is received, and based on the counted time corresponding to a threshold time, control the display to display the screen saver,
    wherein the processor is further configured to:
        identify state information related to an operation of a first application that is being executed on the display apparatus;
        adjust a setting value of an interface application based on the state information related to the first application, the interface application configured to process reset requests from the first application for resetting the counted time based on the state information; and
        perform an accept process or ignore with respect to a reset request according to the adjusted setting value.

2. The apparatus as claimed in claim 1, wherein the processor is further configured to:
    based on the interface application accepting the reset request according to the adjusted setting value, reset the counted time and recount the time for the screen saver; and
    based on the recounted time corresponding to the threshold time, display the screen saver.

3. The apparatus as claimed in claim 1, wherein the processor is further configured to, based on the interface application ignoring the reset request according to the adjusted setting value, continue counting without resetting the counted time, and based on the counted time corresponding to the threshold time, display the screen saver.

4. The apparatus as claimed in claim 1, wherein the state information comprises information on a size of the first application that is being executed on a screen of the display; and
    wherein the processor is further configured to:
        based on identifying that the size of the first application that is being executed is equal to or greater than a threshold size based on the state information, adjust the setting value so that the interface application accepts the reset request; and
        based on identifying that the size of the first application that is being executed is less than a threshold size, adjust the setting value so that the interface application ignores the reset request.

5. The apparatus as claimed in claim 1, wherein the state information comprises information indicating whether the first application that is being executed is reproducing a video content;
    wherein based on identifying that the first application that is being executed is reproducing the video content based on the state information, the setting value is adjusted so that the interface application accepts the reset request; and
    wherein based on identifying that the first application that is being executed is not reproducing the video content based on the state information, the setting value is adjusted so that the interface application ignores the reset request.

6. The apparatus as claimed in claim 1, wherein the first application is a video application that reproduces a video content;
    wherein the state information comprises information regarding a current reproduction section of the video content reproduced by the video application,
    wherein, based on identifying that a current reproduction section of the video content that is being reproduced by the video application is a predetermined time section based on the state information, the setting value is adjusted so that the interface application accepts the reset request; and
    wherein, based on identifying that a current reproduction section of the video content that is being reproduced by the video application is not a predetermined time section based on the state information, the setting value is adjusted so that the interface application ignores the reset request.

7. The apparatus as claimed in claim 1, wherein the processor is further configured to set the first application to transmit the reset request in a period that is less than the threshold time.

8. The apparatus as claimed in claim 1, wherein the processor is further configured to, based on identifying that the first application that is being executed in the display apparatus corresponds to a specific application, not display the screen saver regardless of whether the reset request is received.

9. The apparatus as claimed in claim 8, wherein the processor is further configured to, based on identifying that the first application that is being executed corresponds to the specific application or the reset request is received from the first application that is being executed, execute a screen production function on areas excluding an area in which the first application that is being executed is displayed on a screen of the display.

10. The apparatus as claimed in claim 1, wherein the processor is further configured to:
    based on a subsequent user input being received after the user input is received, reset the counted time;
    recount time for operating the screen saver after receiving the subsequent user input; and
    based on the recounted time corresponding to the threshold time, display the screen saver.

11. A controlling method of a display apparatus, the method comprising:
    counting time for displaying a screen saver after a user input is received; and
    based on the counted time corresponding to a threshold time, displaying the screen saver,
    wherein the counting comprises:
        identifying state information related to an operation of a first application that is being executed on the display apparatus;
        adjusting a setting value of an interface application based on the state information related to the first application, the interface application configured to process reset requests from the first application for resetting the counted time based on the state information; and performing an accept process or ignore with respect to a reset request according to the adjusted setting value.

12. The method as claimed in claim 11, wherein the counting further comprises, based on the interface application accepting the reset request according to the adjusted setting value, resetting the counted time, and wherein based on the recounted time corresponding to the threshold time, displaying the screen saver.

13. The method as claimed in claim 11, wherein the displaying the screen saver comprises, based on the interface application ignoring the reset request according to the adjusted setting value, continuing counting without resetting the counted time, and based on the counted time corresponding to the threshold time, displaying the screen saver.

14. The method as claimed in claim 11, wherein the state information comprises information on a size of the first application that is being executed on a screen of the display;

wherein the adjusting comprises:
based on identifying that the size of the first application that is being executed is equal to or greater than a threshold size based on the state information, adjusting the setting value so that the interface application accepts the reset request; and
based on identifying that the size of the first application that is being executed is less than a threshold size, adjusting the setting value so that the interface application ignores the reset request.

15. The method as claimed in claim 11, wherein the state information comprises information indicating whether the first application that is being executed is reproducing a video content;

wherein the adjusting comprises:
based on identifying that the first application that is being executed is reproducing the video content based on the state information, adjusting the setting value so that the interface application accepts the reset request; and
wherein based on identifying that the first application that is being executed is not reproducing the video content based on the state information, adjusting the setting value so that the interface application ignores the reset request.

16. The method as claimed in claim 11, wherein the first application is a video application that reproduces a video content;

wherein the state information comprises information regarding a current reproduction section of the video content reproduced by the video application, wherein the adjusting comprises:
based on identifying that a current reproduction section of the video content that is being reproduced by the video application is a predetermined time section based on the state information, adjusting the setting value so that the interface application accepts the reset request; and
based on identifying that a current reproduction section of the video content that is being reproduced by the video application is not a predetermined time section based on the state information, adjusting the setting value so that the interface application ignores the reset request.

17. The method as claimed in claim 11, wherein the method further comprising:
setting the first application to transmit the reset request in a period that is less than the threshold time.

18. The method as claimed in claim 11, wherein the method further comprising:
based on identifying that the first application that is being executed in the display apparatus corresponds to a specific application, not displaying the screen saver regardless of whether the reset request is received.

19. The method as claimed in claim 18, wherein the method further comprising:
based on identifying that the first application that is being executed corresponds to the specific application or the reset request is received from the first application that is being executed, executing a screen production function on areas excluding an area in which the first application that is being executed is displayed on a screen of the display.

20. The method as claimed in claim 11, wherein the method further comprising:
based on a subsequent user input being received after the user input is received, resetting the counted time;
recounting time for operating the screen saver after receiving the subsequent user input; and
based on the recounted time corresponding to the threshold time, displaying the screen saver.

* * * * *